United States Patent Office 3,294,774
Patented Dec. 27, 1966

3,294,774
HINDERED TERTIARY AMINES IN POLYMERIZA-
TION OF CONJUGATED DIOLEFINS
Arthur H. Gerber, Linden, and Irving Kuntz, Roselle
Park, N.J., assignors to Esso Research and Engineering
Company, a corporation of Delaware
No Drawing. Filed Mar. 18, 1959, Ser. No. 800,101
2 Claims. (Cl. 260—94.6)

This invention relates to a process for polymerizing isoprene to high molecular weight polymers and especially to rubbery polymers. More particularly, it relates to an improved process of this nature utilizing as a catalyst system a hindered tertiary amine and a lithium-hydrocarbon compound.

The polymerization of isoprene to rubbery polymers utilizing lithium-hydrocarbon catalysts is known. It is, of course, desirable to have high polymerization rates but it is also necessary, however, to maintain the stereospecificity, i.e., a high (90% or greater) 1,4-cis-addition to simulate the properties of natural rubber. Many additives, however, that have been tried to increase the reactivity also cause diminution of this stereospecificity so that their disadvantages more than offset their advantages.

It has now been found that in the polymerization of isoprene to rubbery polymers utilizing a lithium-hydrocarbon catalyst the utilization of minor amounts of a hindered tertiary amine as a co-catalyst increases the polymerization rate, without any diminution of polymerization stereospecificity. This is indeed surprising since simple tertiary amines destroy this stereospecificity.

The hindered tertiary amines utilized are characterized by the formula:

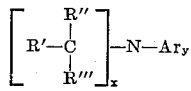

where Ar is an aromatic radical; R', R", and R''' are radicals selected from the group consisting of alkyl and hydrogen radicals; $x$ and $y$ are integers from 0 to 3, the sums of $x$ and $y$ being 3; at least one of the R', R", and R''' radicals being an alkyl group when $y$ is at least 1; and at least two of the R', R", and R''' radicals being alkyl groups when $y$ is 0. R', R", and R''' can thus be the same or different radicals. It is to be understood that the term Ar also connotes alkaryl and aralkyl radicals. Typical examples of hindered tertiary amines are N,N-diethyl aniline and tri-isoamylamine, tri-isobutyl amine, ethyl diphenyl amine, N,N-di(n-propyl) aniline, dimethyl t-butyl amine, diethyl cyclohexyl amine, N-ethyl piperidine, N,N-diethyl o-toluidine, n-propyl di-isopropyl amine, tri-n-octyl amine, and N,N-diethylamino-tetralins. The first two are particularly effective.

A minor amount of the hindered tertiary amine is utilized. Thus, the amount conveniently is in the range of 0.001 to 5.0 mole percent based on isoprene.

The lithium hydrocarbon catalysts used are those known in the art. Typical examples thus include n-butyl lithium and other alkyl, alkaryl or cycloalkyl lithiums such as propyl lithium, isobutyl lithium, amyl lithium, cyclohexyl lithium, phenyl ethyl lithium, etc. This material is utilized in an amount of 0.01 to 5.0 mole percent based on isoprene.

The remaining conditions are similar to those conventionally employed. Solvents such as heptane, pentane or other non-polar, non-acidic solvents may be used such as cyclohexane, petroleum ether, methyl cyclopentane, etc. Temperatures in the range of —20° to 200° C. and pressures of 0.5 to 100 atmospheres are employed.

When the desired degree of polymerization has been reached the polymer may be isolated by precipitation with a non-solvent such as acetone, methanol, isopropyl alcohol, etc. Alternately the solution can be injected into a slurry tank containing a hot non-solvent or the viscous solution can be extruded into a vacuum extruder to evaporate the solvent and afford spaghetti-like strands of polymer.

The rubbery polymers produced have intrinsic viscosities in the range of 0.8 to 20 or even higher. Lower intrinsic viscosity materials may be used as synthetic drying oils, etc. The rubbery polymer of this invention may be handled in the rubber factory like natural rubber and affords vulcanizates of excellent properties.

This invention and its advantages will be better understood by reference to the following examples.

Example 1

The polymerization experiments were all carried out in clean, dry 1-oz. screw cap bottles. The bottles were charged in a dry box under an atmosphere of nitrogen. The solvent for the polymerization was n-heptane which had been scrupulously dried. All the amines had been freshly distilled in vacuo from zinc dust. A descriptive example of the experimental procedure for the polymerization follows:

The polymerization bottles were each charged with 10 cc. of n-heptane and 10 cc. (0.1 mole) of pure isoprene. Then 0.5 mole percent (on monomer) of the appropriate amine was added to each bottle. The bottles and contents were cooled to about 10° C. and then a solution of n-butyl lithium in heptane (0.68 molar) added to each so that the final concentration of active n-butyl lithium was 0.2 mole percent (on isoprene). The bottles were tightly capped, withdrawn from the dry box, taped well to exclude air and placed in a water bath at 20–22° C. for a period of 5½ hours with frequent agitation being applied.

The percent conversion was determined by removal of a small portion of the polymer solution and then drying to constant weight in a vacuum oven. The remainder of polymer was precipitated with methanol containing an antioxidant, and also dried to constant weight. Structural configuration was determined by infrared techniques on 1–2% solutions of the polymer in carbon disulfide.

Table I lists the results obtained in these polymerization experiments.

TABLE I

| Ex. | Substance Added (0.5 mol percent on Monomer) | Percent Conversion | Intrinsic Viscosity (20°, Benzene) | Molecular Weight ×10⁻³ [a] |
|---|---|---|---|---|
| 1 | None | 78 | 0.41 | 3.9 |
| 2 | N,N-diethyl aniline | 85 | 0.49 | 4.7 |
| 3 | Tri-isoamylamine | 86 | 0.63 | 6.1 |

[a] Using the relationship of Gee, Trans. Far. Soc., 40, 264 (1944).

Table II presents the mode of addition in these polymerizations as determined by infrared spectroscopy.

TABLE II.—STRUCTURE OF POLYISOPRENES [a]

| Experiment | Percent Addition | | | |
|---|---|---|---|---|
| | 1,2 | 3,4 | Cis | Trans |
| 1 | 0.5 | 10 | 90±9 | 5 |
| 2 | 0.5 | 10 | 85±9 | 5 |
| 3 | 0.4 | 15 | 80±8 | 10 |

[a] Precision is of the order ±10% (relative).

It is obvious from the data that the addition of sterically hindered tertiary amines caused an increase in polymerization rate. These rate effects are coupled with a significant increase in molecular weight of the resulting polyisoprene in the particular experiments cited with no experimentally measurable undesirable effect on stereochemical structure. In a commercial plant it is difficult to handle extremely viscous polymer solutions. Therefore, either solutions with low concentrations of polymer or continuous processes operating at low conversions are necessary. Higher polymerization rates such as are found with the catalyst system of this invention make it possible to increase production in a continuous process without altering plant design. Such increased production rate is also advantageous in a process operating in a batch fashion.

Those examples with hindered tertiary amines should be contrasted with the result obtained with unhindered tertiary amines. Thus 0.5 mole percent on the monomer of trimethyl amine was utilized under similar polymerization conditions described in Experiments 1–3. The polymer was isolated and the structural distribution of the polymerization addition was as follows:

| | Percent |
|---|---|
| 1,2 | 2 |
| 3,4 | 45 |
| Cis-1,4 | 30 |
| Trans-1,4 | 25 |

This data demonstrate that simple tertiary amines destroy the desirable cis-1,4-structure, and yield large amounts of trans-1,4 and 3,4-units. Such polymers do not display the desirable resilience and hysteresis properties of the high cis-1,4-polymers.

It is found that under conditions which yield high intrinsic viscosity polyisoprenes in the rubbery range, the same type of improvement in polymerization rate is observed.

The process of this invention is applicable to other conjugated dienes such as butadiene, piperylene, 2,3-dimethyl butadiene, etc.

The advantages of this invention will be apparent to those skilled in the art. The polymerization rates in the process are increased without any diminution of stereospecificity, making higher production rates possible.

It is to be understood that this invention is not limited to the specific examples which have been offered merely as illustrations and that modifications may be made without departing from the spirit of the invention.

What is claimed is:
1. In a process for preparing substantially cis-polyisoprene at an increased polymerization rate, the improvement which comprises contacting isoprene in the presence of a catalyst system consisting essentially of n-butyl lithium and N,N-diethyl aniline, in the presence of an inert solvent, at a temperature of −20° to 200° C. and a pressure from 0.5 to 100 atmospheres, the n-butyl lithium being utilized in an amount of from 0.01 to 5.0 mole percent based on the isoprene and N,N-diethyl aniline being utilized in an amount of from 0.001 to 5.0 mole percent based on the isoprene.

2. In a process for preparing substantially cis-polyisoprene at an increased polymerization rate, the improvement which comprises contacting isoprene in the presence of a catalyst system consisting essentially of n-butyl lithium and tri-isoamylamine in the presence of an inert solvent, at a temperature of from −20° to 200° C. and a pressure of from 0.5 to 100 atmospheres, the n-butyl lithium being utilized in an amount of from 0.01 to 5.0 mol percent based on the isoprene and the tri-isoamylamine being utilized in an amount of from 0.001 to 5.0 mol percent based on the isoprene.

References Cited by the Examiner

UNITED STATES PATENTS

| | | | |
|---|---|---|---|
| 2,529,315 | 11/1950 | Serniuk | 260—94.6 |
| 2,610,965 | 9/1952 | Vandenberg | 260—94.6 |
| 2,849,432 | 8/1958 | Kibler et al. | 260—94.2 |
| 2,905,645 | 9/1959 | Anderson et al. | 260—94.9 |
| 3,036,056 | 5/1962 | Rion | 260—94.7 |
| 3,095,406 | 6/1963 | Short et al. | 260—94.3 |

FOREIGN PATENTS 61,837  10/1912  Switzerland.

OTHER REFERENCES

Morita et al.: J. Am. Chem. Soc., vol. 79 (1957), pages 5853–5855. (Copy in Patent Office Lib.).

JOSEPH L. SCHOFER, *Primary Examiner.*

WILLIAM H. SHORT, DANIEL ARNOLD, LESLIE H. GASTON, MORRIS LIEBMAN, *Examiners.*

J. M. TEPLITZ, E. J. SMITH, *Assistant Examiners.*